Oct. 9, 1951 R. A. BRADEN 2,570,758

AUTOMATIC FREQUENCY CONTROL

Filed Sept. 4, 1946 3 Sheets-Sheet 1

INVENTOR
Rene A. Braden
BY
W. S. Grover
ATTORNEY

Oct. 9, 1951 R. A. BRADEN 2,570,758

AUTOMATIC FREQUENCY CONTROL

Filed Sept. 4, 1946 3 Sheets-Sheet 2

INVENTOR
Rene A. Braden
BY H. S. Grover.
ATTORNEY

Oct. 9, 1951 R. A. BRADEN 2,570,758

AUTOMATIC FREQUENCY CONTROL

Filed Sept. 4, 1946 3 Sheets-Sheet 3

INVENTOR

Rene A. Braden

BY

W. G. Groves

ATTORNEY

Patented Oct. 9, 1951

2,570,758

UNITED STATES PATENT OFFICE 2,570,758

AUTOMATIC FREQUENCY CONTROL

Rene A. Braden, Lawrence Township, Mercer County, N. J., assignor to Radio Corporation of America, a corporation of Delaware Application September 4, 1946, Serial No. 694,753

15 Claims. (Cl. 250—36)

Figures 1, 2:
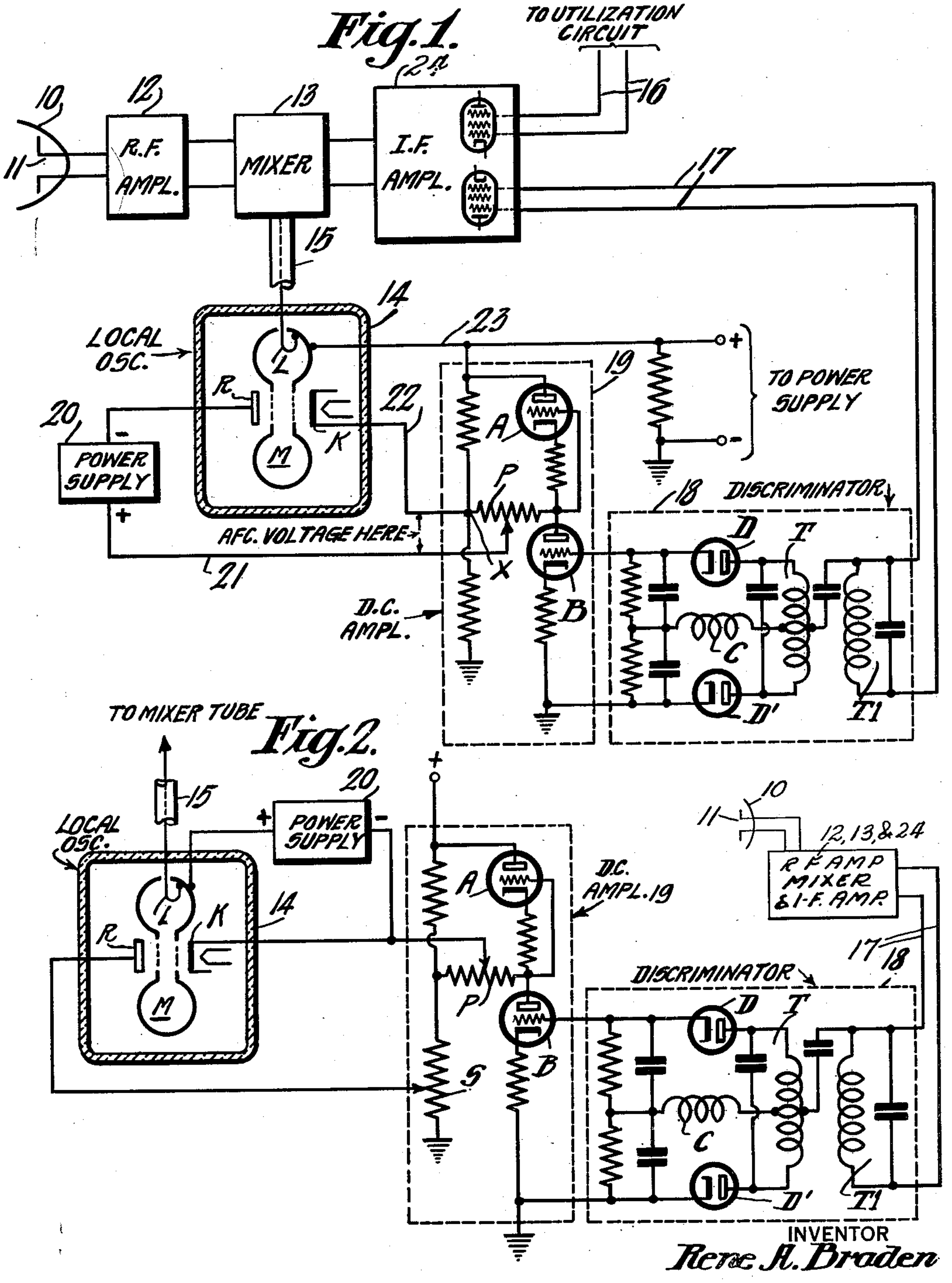

This invention relates to the frequency control of high frequency systems.

An object of the present invention is to maintain a constant frequency difference between the output of a local oscillator and a source of incoming waves.

Other objects will appear from a reading of the following description which is accompanied by drawings wherein:

Figs. 1 through 6 show six different embodiments of the invention as applied to a signal receiving system.

Although the invention is described in connection with a signal receiving system, it should be understood that the invention is not limited thereto but has general application to other systems wherein a frequency control is required.

Throughout the figures of the drawing, the same parts are represented by the same reference numerals.

Referring to Fig. 1 of the drawing, there is shown a signal receiving system comprising an antenna having a reflector 10 and in the focus thereof, a dipole 11. This antenna is a wave directive structure for receiving waves transmitted thereto from a remote source. It should be understood that this antenna is merely illustrative of any suitable wave collecting structure. The output of the antenna is coupled to the input of a suitable radio frequency selective stage 12. The output of stage 12 is coupled to a frequency converter or mixer tube 13 which is supplied with oscillations from a local heterodyning oscillator 14 via line 15. The output from the mixer 13 is a beat frequency which is the sum or difference of the frequencies of the incoming wave and the oscillations produced by the local heterodyning oscillator 14. This beat frequency is an intermediate frequency which is supplied to the intermediate frequency amplifier stage 24. The output of the intermediate frequency stage 24 is fed via one output tube to a suitable utilization circuit over lead 16, and also via another output tube over leads 17 to the automatic frequency control circuit constituting the gist of the present invention. The two output tubes in the I. F. amplifier stage 24 serve to separate the two loads in order to prevent detuning of the discriminator or change of its selectivity and at the same time prevent the discriminator from interfering with the operation of the utilization circuit.

The automatic frequency control system of Fig. 1 includes a frequency discriminator 18, a D. C. amplifier 19, a suitable power supply 20 and connections which couple these circuits to each other and to the local oscillator 14 in such manner as to maintain a constant frequency difference between the frequency of the incoming waves and the frequency of the local oscillator.

The local oscillator 14 is shown as a reflex "Klystron." The oscillator may generate oscillations of the order of 4,000 megacycles per second although this frequency is given merely by way of illustration. Oscillator 14 is shown as comprising an evacuated envelope having a cathode K for producing a beam of electrons, a toroidal cavity resonator M of suitable dimensions and having apertures in both sides to permit electrons from the cathode K to pass therethrough, and a reflector or repeller electrode R. The voltage on the repeller electrode is of negative polarity relative to the cathode, and repels the electrons passing through the cavity resonator M. The electrons in this "Klystron" oscillator move to and fro through the cavity resonator M until they are finally collected. The dimensions of the cavity resonator M and the voltage on the reflector electrode R determine to a large extent, the frequency of the oscillations generated by the reflex "Klystron" 14. Such an oscillator is well known in the art and no claim is made to it per se.

Output from the local oscillator 14 is taken from a coupling loop L located in the interior of the cavity resonator M. This loop is coupled to a coaxial transmission line 15 which extends to one of the electrodes of the mixer or frequency converter 13.

The negative voltage on the reflector electrode R of the local oscillator 14 is supplied by means of a floating power supply source 20 whose positive terminal is connected via a lead 21 to a tap on a potentiometer P in the D. C. amplifier 19. The cathode of the local oscillator K is connected via lead 22 to the junction point X of a network of resistors in the D. C. amplifier 19. The automatic frequency control voltage for varying the frequency of the local oscillator 14 appears between leads 21 and 22 and this control voltage has a polarity which depends upon the direction of frequency departure from the desired constant frequency difference (beat frequency applied to discriminator 18), and has a magnitude which depends upon the extent of this frequency departure from the desired constant frequency difference.

The D. C. amplifier 19 comprises a pair of vacuum tubes A and B arranged in series, as shown and a resistor network including a gain control resistor or potentiometer P. Output is taken from this gain control resistor P via a tap or slider associated with lead 21. Maximum gain is obtained when the tap on resistor P is nearest the anode of tube B. This D. C. amplifier is shown and described in detail in U. S. Patent 2,310,342, granted February 9, 1943, to M. Artzt to which reference is herein made. This D. C. amplifier circuit 19 not only compensates for frequency changes of either the local oscillator 14 or the source of incoming waves collected on the antenna 10, 11, that is, compensates for any departure from a predetermined beat frequency or frequency difference between them, but also compensates for voltage variations in the floating power supply 20 and in the power supply which supplies the anode polarizing potential for the cavity resonator M of the local oscillator via lead 23.

The frequency discriminator 18 comprises a pair of diode rectifiers D and D′ arranged back-to-back. The anodes of these diodes are coupled to opposite terminals of a parallel tuned circuit T, and this tuned circuit T is magnetically coupled to another tuned circuit T′. It should be noted that the electrical center of the inductance coil of the tuned circuit T is capacitively coupled to the high potential end of the tuned circuit T′, and furthermore that this electrical center point is coupled via a choke coil C to the electrical center of a resistor-shunt capacitor arrangement connected between the cathodes of the diodes. The output of the intermediate frequency amplifier 24 which comprises the beat frequency, is connected via leads 17 to the tuned circuit T′. The output of the discriminator 18 is connected between the grid and the cathode of the tube B of the D. C. amplifier 19.

In the operation of the discriminator 18, the output of this circuit, as applied across the grid and cathode of tube B of the D. C. amplifier, is zero or a minimum when the beat frequency in leads 17 applied to the discriminator is a predetermined frequency equal to the desired constant frequency difference between the output of the local oscillator 14 and the frequency of the incoming waves. If this beat frequency in lead 17 should vary to one side or the other of the desired constant frequency difference due to a change in frequency of the local oscillator 14 or a change in frequency of the incoming waves collected on the antenna, the voltage appearing in the output of the discriminator will also vary one side or the other of the minimum or zero voltage. Putting it in other words, the polarity of the voltage in the output of discriminator 18 depends upon the direction of the frequency departure from the desired constant frequency difference and the magnitude of this voltage in the output of the discriminator depends upon the extent of the frequency departure from the desired constant frequency difference.

Any variation in voltage appearing in the output of the discriminator caused by a departure in frequency in leads 17 from the predetermined desired beat frequency will be amplified in the D. C. amplifier 19 and will appear as a variable voltage on the gain control resistor P and this variable voltage is passed through the floating bias or power supply 20 to the reflector electrode R. The variation in voltage appearing on reflector electrode R of the local oscillator is of such sense and magnitude as to compensate for frequency changes or departures from the desired constant beat frequency in leads 17.

In summation, it will be evident that the voltage developed in the output of the discriminator 18 is a function of the frequency difference between the heterodyning frequency (frequency of the local oscillator 14) and the frequency of the incoming signal and that this varying voltage is applied to the reflector electrode of the local oscillator 14 by way of a D. C. amplifier 19 and the power supply 20.

Fig. 2 is a modification of the automatic frequency control of Fig. 1. Only those circuits have been shown in Fig. 2 which are necessary to an understanding of the invention. In Fig. 2, the cathode K of the local oscillator 14 is supplied with a variable voltage from the D. C. amplifier 19 while the repeller electrode R is maintained at a constant potential with respect to ground. It should be noted that the bias for the repeller electrode R is obtained by virtue of a tap on resistor S which is part of the resistor network of the D. C. amplifier 19. The power supply 20 in Fig. 2 is so connected that its positive terminal supplies voltage to the cavity resonator M while its negative terminal is connected to the cathode K.

Figure 3:
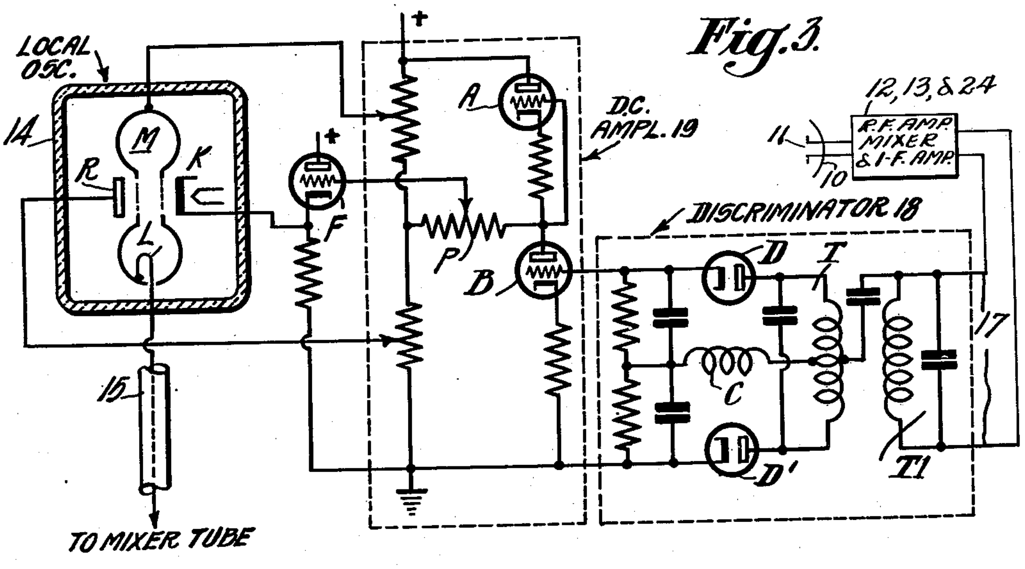

Fig. 3 is a modification of the system of Fig. 2 and is somewhat similar in operation thereto except for the use of a cathode follower vacuum tube F between the cathode K of the local oscillator 14 and the gain control resistor P of the D. C. amplifier 19. This cathode follower F allows the gain of the D. C. amplifier 19 to be higher than permissible in the system of Fig. 2, because in Fig. 2 the local oscillator 14 is a load on the D. C. amplifier and reduces the effective gain, whereas in Fig. 3 the grid of the cathode follower has a very high impedance and is not as great a load on the D. C. amplifier. It should be noted that in Fig. 3, the need for a floating power supply is eliminated.

Figure 4:
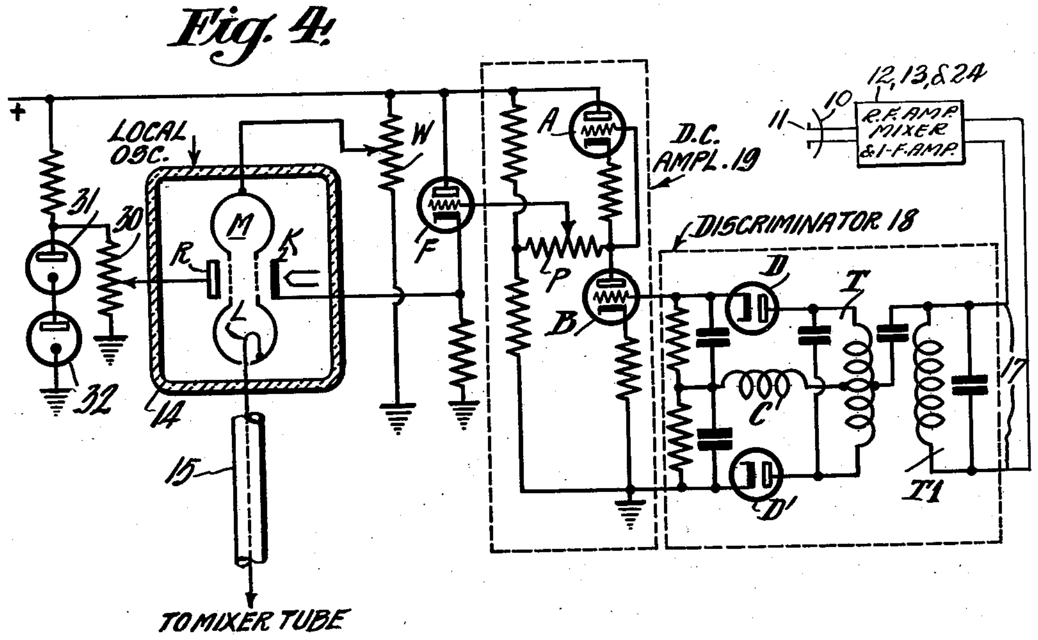

Fig. 4 is a further modification which is preferred over the arrangement of Fig. 3. In Fig. 4, the anode voltage or voltage for the cavity resonator M is taken from a tap on a separate resistor W rather than directly from the D. C. amplifier as shown in Fig. 3. The arrangement of Fig. 4 avoids any possible unbalance in the D. C. amplifier circuit. It should be noted further, that the voltage for the repeller R of the local oscillator 14 is now obtained from a resistor 30 forming part of a voltage stabilizer circuit employing a number of glow lamps or voltage regulator tubes 31 and 32 arranged in series. These voltage regulator tubes may be neon or argon lamps. The number of lamps in series depends on the voltage required. The voltage drop across lamps 31 and 32 is constant if enough current is applied to cause them to light. This constant voltage drop is applied to resistor 30, and a selected fraction thereof is applied to the repeller electrode R. It should be noted that the discriminator 18 is at ground potential, and that only one power supply is required. The output from the discriminator is relatively small but this output is amplified by the D. C. amplifier 19.

Figure 5:
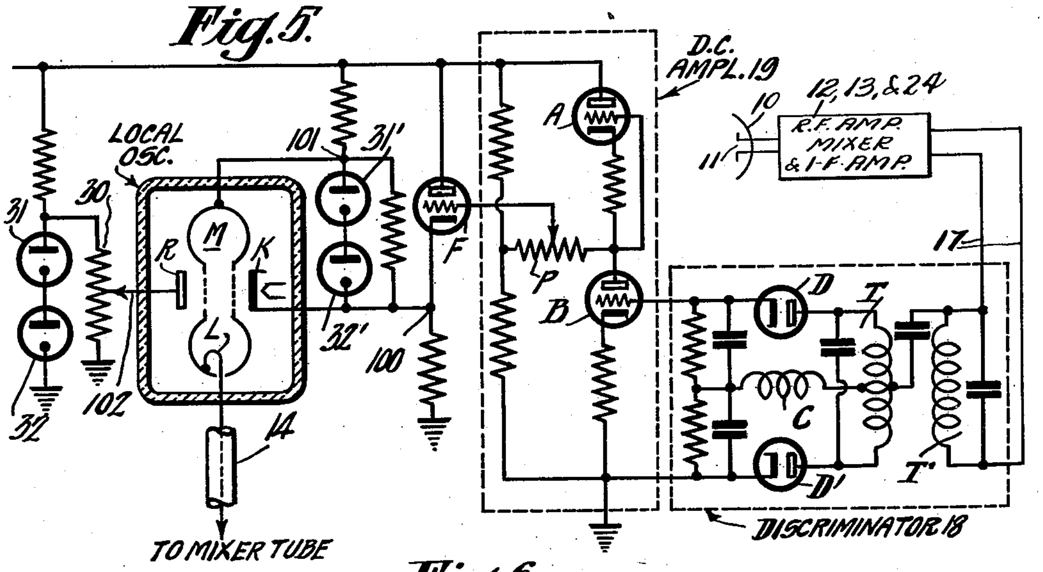

Fig. 5 is a refinement over the circuit of Fig. 4 and differs from Fig. 4 in the use of a second set of voltage regulator tubes or glow lamps 31′ and 32′ across the cavity resonator and cathode of the local oscillator 14 so as to maintain the voltage of the anode or cavity resonator M constant relative to the cathode K. Here again as in Fig. 4, the repeller electrode is held at a constant voltage by glow lamps 31 and 32. The voltage on the grid of the cathode follower F which varies in accordance with the variation in amplified A. F. C. voltage on the gain control resistor P of the D. C. amplifier 19 changes the potential of the cathode K of the local oscillator 14 with respect to its repeller electrode R, thus controlling the frequency of the local oscillator 14. Obviously, the tap on resistor 30 which is connected to the repeller electrode R is so adjusted that the local oscillator 14 oscillates. Suitable time constants are introduced in the discriminator or between it and the D. C. amplifier grid. In order to operate the system of Fig. 5, approximate voltages relative to ground at points 100, 101 and 102 may be +200 volts, +500 volts and +50 volts respectively.

Figure 6:
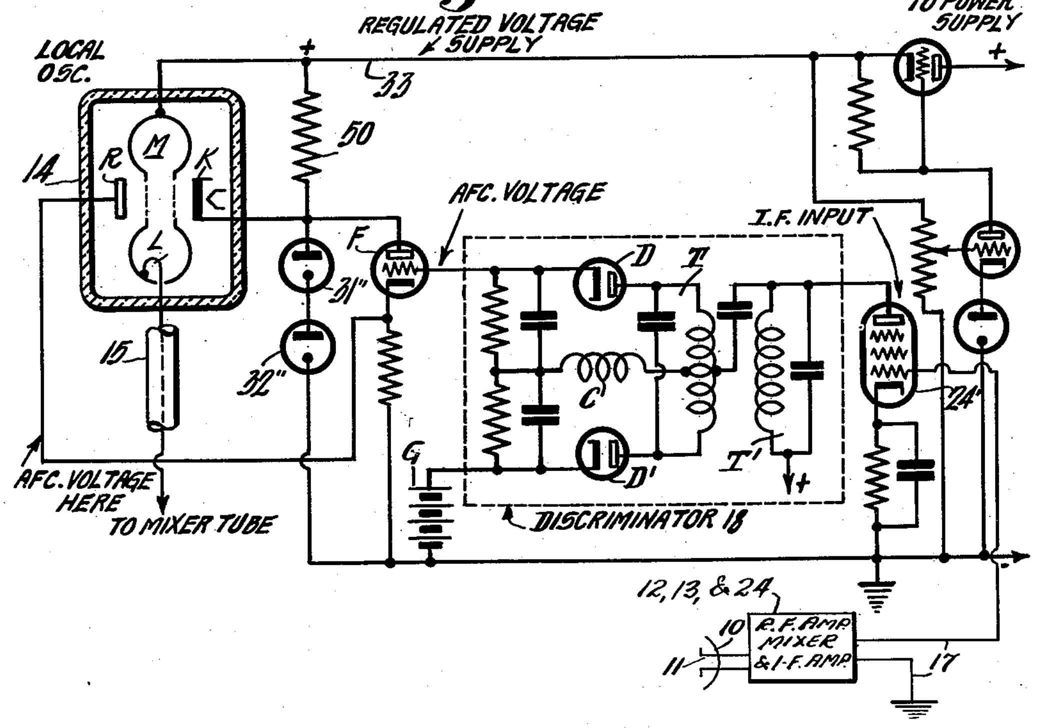

Fig. 6 illustrates a still further modification which eliminates the use of a D. C. amplifier shown in the other figures. It should be noted that the cathode K of the local oscillator 14 is directly connected to the anode of the cathode follower tube F, and that there are provided a pair of voltage regulator tubes 31'' and 32'' across the anode and cathode of tube F. The discriminator 18 has one output terminal connected to the grid of the follower F and the other output terminal connected through an adjustable bias battery G to the common negative terminal of the circuit, which may be also a ground connection. A regulated voltage supply appears in lead 33 for use on the anode of local oscillator 14 and on the voltage regulator tubes. Power for the local oscillator is provided by a power supply whose negative side is grounded. This voltage is regulated by a voltage regulator. The output voltage of the regulator is divided between the resistor 50 and the regulator lamps 31'', 32'' which are so proportioned that the drop across resistor 50 will be the correct anode-to-cathode voltage for the oscillator and the drop across the tubes 31'', 32'' will be comewhat greater than the required cathode-to-repeller electrode voltage. The voltage applied to the cathode follower is stabilized by the voltage regulator 31'', 32'', while the total voltage across resistor 50 and tubes 31'', 32'' is held constant by the vacuum tube voltage regulator. Hence, the anode voltage is also stabilized. The bias battery G is so adjusted that the local oscillator 14 oscillates at the center of its range when no controlling signal is impressed on one of the intermediate frequency output tubes 24'. Putting it in other words, over a certain range of adjustment of the bias battery the oscillator tube will oscillate, since this bias acting through the cathode follower controls the repeller voltage. The bias battery should be set at the center of this range, as this allows the A. F. C. voltage to effect control over equal ranges in each direction from the value obtained when the control voltage is zero. Of course, a similar adjustment is preferred in all the circuits, though the required condition is arrived at in different ways in the different circuits. Obviously, if the manual adjustment is left at the point where the tube just started to oscillate, the A. F. C. would work when frequency deviated in one direction from the desired value, but not in the other. In making initial adjustments, one sets the voltages so the tube oscillates, checks frequency, then tunes the cavity so that the tube oscillates at the desired frequency. Generally several successive readjustments of cavity and repeller voltage must be made to get the frequency at the right value with the repeller voltage at the middle of the range within which it causes the tube to oscillate.

What is claimed is:

1. An automatic frequency control system comprising a local vacuum tube oscillator having electrodes and having a frequency of oscillation which is responsive to the voltage difference therebetween, a source of waves with which the frequency of said oscillator is to be compared, and means for maintaining a constant frequency difference between the frequency of oscillation of said oscillator and the frequency of said source, said means including apparatus for beating said waves with the oscillations from said oscillator to derive beat frequency oscillations, a frequency discriminator having a pair of coupled tuned circuits, connections to supply said beat frequency oscillations to said discriminator, a balanced direct current amplifier in the output of said discriminator, and circuit connections from said amplifier to two electrodes of said oscillator to control the voltage therebetween.

2. An automatic frequency control system comprising a local vacuum tube oscillator having electrodes and having a frequency of oscillation which is responsive to the voltage difference therebetween, a source of waves with which the frequency of said oscillator is to be compared, and means for maintaining a constant frequency difference between the frequency of oscillation of said oscillator and the frequency of said source, said means including apparatus for beating said waves with the oscillations from said oscillator to derive beat frequency oscillations, a frequency discriminator having a pair of coupled tuned circuits, connections for supplying said beat frequency oscillations to said discriminator, a balanced direct current amplifier in the output of said discriminator, and circuit connections from said amplifier to two electrodes of said oscillator to control the voltage therebetween, one of said last connections including a floating bias supply for one of said two electrodes of said oscillator.

3. An automatic frequency control system comprising a local vacuum tube oscillator having electrodes and having a frequency of oscillation responsive to the voltage on one of said electrodes, a source of waves with which the frequency of said oscillator is to be compared, and means for maintaining a constant frequency difference between the frequency of oscillation of said oscillator and the frequency of said source, said means including apparatus for beating said waves with the oscillations from said oscillator to derive beat frequency oscillations, a frequency discriminator having a pair of coupled tuned circuits, connections for supplying said beat frequency oscillations to said discriminator, a balanced direct current amplifier in the output of said discriminator, said amplifier having an adjustable gain control resistor, and a connection from said gain control resistor to said one electrode of said oscillator.

4. An automatic frequency control system comprising a local vacuum tube oscillator having electrodes and having a frequency of oscillation responsive to the voltage on one of said electrodes, a source of waves with which the frequency of said oscillator is to be compared, and means for maintaining a constant frequency difference between the frequency of oscillation of said oscillator and the frequency of said source, said means including apparatus for beating said waves with the oscillations from said oscillator to derive beat frequency oscillations, a frequency discriminator having a pair of coupled tuned circuits, connections for supplying said beat frequency oscillations to said discriminator, a balanced direct current amplifier in the output of said discriminator, said amplifier having an adjustable gain control element, and a connection, including a cathode follower tube, from said gain control element to said one electrode of said oscillator.

5. An automatic frequency control system comprising a local vacuum tube oscillator having electrodes and having a frequency of oscillation responsive to the voltage on said electrodes, a source of waves with which the frequency of said oscillator is to be compared, and means for maintaining a constant frequency difference between the frequency of oscillation of said oscillator and the frequency of said source, said means including apparatus for beating said waves with the oscillations from said oscillator to derive beat frequency oscillations, a frequency discriminator, connections for supplying said beat frequency oscillations to said discriminator, a balanced direct current amplifier in the output of said discriminator, said amplifier having an adjustable gain control element, and a connection, including a cathode follower tube, from said gain control element to one of said electrodes of said oscillator, and a voltage stabilizing circuit for maintaining at least one other electrode of said oscillator at a constant voltage with respect to a common ground connection of the system to said amplifier, over a wide range of currents.

6. An automatic frequency control system comprising a reflex oscillator having a cathode, a cavity resonator and a repeller electrode, a source of waves with which the frequency of said oscillator is to be compared, and means for maintaining a constant frequency difference between the frequency of oscillation of said oscillator and the frequency of said waves, said means including apparatus for beating said waves with the oscillations from said oscillator to produce beat frequency oscillations, a frequency discriminator, connections for supplying the beat frequency oscillations to said discriminator, a balanced direct current amplifier in the output of said discriminator, a gain control resistor in said amplifier, a cathode follower having a grid connected to said control resistor and a cathode connected to the cathode of said oscillator, a direct current power supply connected to maintain said cavity resonator at a positive potential relative to said oscillator cathode, and a voltage stabilizing circuit for maintaining said cavity resonator potential substantially constant relative to the oscillator cathode.

7. An automatic frequency control system comprising a reflex oscillator having a cathode, a cavity resonator and a repeller electrode, a source of waves with which the frequency of said oscillator is to be compared, and means for maintaining a constant frequency difference between the frequency of said oscillator and the frequency of said source, said means including apparatus for beating said waves with the oscillations from said oscillator to produce beat frequency oscillations, a frequency discriminator, connections for supplying said beat frequency oscillations to said discriminator, a balanced direct current amplifier in the output of said discriminator, a gain control resistor in said amplifier, a cathode follower having a grid connected to said control resistor and a cathode connected to the cathode of said oscillator, a direct current power source connected to maintain said cavity resonator at a positive potential relative to said oscillator cathode, and a connection from the repeller electrode to said amplifier.

8. An automatic frequency control system comprising a reflex oscillator having a cathode, a cavity resonator and a repeller electrode, a source of waves with which the frequency of said oscillator is to be compared, and means for maintaining a constant frequency difference between the frequency of said oscillator and the frequency of said source, said means including apparatus for beating said waves with the oscillations from said oscillator to produce beat frequency oscillations, a frequency discriminator, connections for supplying said beat frequency oscillations to said discriminator, a balanced direct current amplifier in the output of said discriminator, a gain control resistor in said amplifier, a cathode follower having a grid connected to said control resistor and a cathode connected to the cathode of said oscillator, a direct current power supply connected to maintain said cavity resonator at a positive potential relative to said oscillator cathode, and individual voltage stabilizing circuits for said cavity resonator and said repeller electrode, one said stabilizing circuit to maintain said resonator at a substantially fixed voltage with respect to said cathode and the other said stabilizing circuit to maintain said repeller electrode at a substantially fixed voltage with respect to a common ground connection between said repeller electrode and said amplifier.

9. An automatic frequency control system comprising a reflex oscillator having a cathode, a cavity resonator and a repeller electrode, a source of waves with which the frequency of said oscillator is to be compared, and means for maintaining a constant frequency difference between the frequency of said oscillator and the frequency of said source, said means including apparatus for beating said waves with the oscillations from said oscillator to produce beat frequency oscillations, a frequency discriminator, connection for supplying said beat frequency oscillations to said discriminator, a balanced direct current amplifier in the output of said discriminator, a gain control resistor in said amplifier, a cathode follower having a grid connected to said control resistor and a cathode connected to the cathode of said oscillator, said amplifier having two vacuum tubes serially connected and having a resistor network connected across said tubes, and individual connections from the cavity resonator and the repeller electrode to different points on said resistor network having different direct potentials.

10. An automatic frequency control system comprising a local vacuum tube oscillator having electrodes and having a frequency of oscillation responsive to the voltage difference therebetween, a source of waves with which the frequency of said oscillator is to be compared, and means for maintaining a constant frequency difference between the frequency of oscillation of said oscillator and the frequency of said source, said means including apparatus for beating said waves with the oscillations from said oscillator to derive beat frequency oscillations, a frequency discriminator, connections to supply said beat frequency oscillations to said discriminator, and a cathode follower having a grid connected to said discriminator to receive the output thereof and a cathode and an anode connected between said oscillator electrodes to control the voltage therebetween.

11. An automatic frequency control system comprising a local vacuum tube oscillator having electrodes and having a frequency of oscillation responsive to the voltage difference therebetween, a source of waves with which the frequency of said oscillator is to be compared, and means for maintaining a constant frequency difference between the frequency of oscillation of said oscillator and the frequency of said source, said means including apparatus for beating said waves with the oscillations from said oscillator to derive beat frequency oscillations, a frequency discriminator, connections to supply said beat frequency oscillations to said discriminator, a balanced direct current amplifier in the output of said discriminator, a cathode follower having a grid connected to receive the output of said amplifier and having a cathode and an anode connected to said oscillator electrodes to control the voltage therebetween.

12. An automatic frequency control system comprising a local vacuum tube oscillator having electrodes and having a frequency of oscillation responsive to the voltage difference therebetween, a source of waves with which the frequency of said oscillator is to be compared, and means for maintaining a constant frequency difference between the frequency of oscillation of said oscillator and the frequency of said source, said means including apparatus for beating said waves with the oscillations from said oscillator to derive beat frequency oscillations, a frequency discriminator, connections to supply said beat frequency oscillations to said discriminator, and a cathode follower having a grid connected to said discriminator to receive the output thereof and a cathode and an anode connected between said oscillator electrodes to control the voltage therebetween, and a voltage stabilizer circuit coupled to the cathodes of said follower and of said oscillator.

13. An automatic frequency control system comprising a local vacuum tube oscillator of the klystron type having an ungrounded cavity resonator with repeller and cathode electrodes on opposite sides of the resonator, said oscillator having a frequency of oscillation which depends upon the voltage difference between said electrodes, a source of waves with which the frequency of said oscillator is to be compared, and means for maintaining a constant frequency difference between the frequency of oscillation of said oscillator and the frequency of said source, said means including apparatus for beating said waves with the oscillations from said oscillator to derive beat frequency oscillations, a frequency discriminator, connections for supplying said beat frequency oscillations to said discriminator, a balanced direct current amplifier in the output of said discriminator, said amplifier having an adjustable gain control element, a cathode follower tube having a grid connected to said gain control element and having a cathode connected to the cathode of said oscillator, and a voltage stabilizing circuit for maintaining the repeller electrode of said oscillator at a constant potential with respect to ground over a wide range of currents.

14. An automatic frequency control system in accordance with claim 13, characterized in this, that said voltage stabilizer circuit comprises a pair of serially arranged regulator tubes connected between ground and the positive terminal of a source of unidirectional potential through a resistor, another resistor in shunt to said pair of regulator tubes, and a connection from said repeller electrode to a tap on said last resistor.

15. An automatic frequency control system comprising a local vacuum tube oscillator of the klystron type having an ungrounded cavity resonator with repeller and cathode electrodes on opposite sides of the resonator, said oscillator having a frequency of oscillation which depends upon the voltage difference between said electrodes, a source of waves with which the frequency of said oscillator is to be compared, and means for maintaining a constant frequency difference between the frequency of oscillation of said oscillator and the frequency of said source, said means including apparatus for beating said waves with the oscillations from said oscillator to derive beat frequency oscillations, a frequency discriminator, connections to supply said beat frequency oscillations to said discriminator, and a cathode follower having a grid coupled to said discriminator and having a cathode coupled to the cathode of said oscillator.

RENE A. BRADEN.

REFERENCES CITED

The following references are of record in the file of this patent:

UNITED STATES PATENTS

| Number | Name | Date |
|---|---|---|
| 2,294,942 | Varian et al. | Sept. 8, 1942 |
| 2,321,269 | Artzt | June 8, 1943 |
| 2,337,214 | Tunick | Dec. 21, 1943 |
| 2,377,327 | Seeley | June 5, 1945 |
| 2,404,568 | Dow | July 23, 1946 |
| 2,410,817 | Ginzton | Nov. 12, 1946 |
| 2,414,100 | Hansen et al. | Jan. 14, 1947 |
| 2,434,294 | Ginzton | Jan. 13, 1948 |
| 2,452,575 | Kenny | Nov. 2, 1948 |
| 2,453,265 | Jaynes | Nov. 16, 1948 |
| 2,462,294 | Thompson | Feb. 22, 1949 |
| 2,474,580 | Hiehle | June 28, 1949 |
| 2,475,074 | Bradley et al. | July 5, 1949 |
| 2,529,579 | Thompson | Nov. 14, 1950 |